United States Patent
Nakano

(10) Patent No.: US 8,931,876 B2
(45) Date of Patent: Jan. 13, 2015

(54) STORAGE APPARATUS, HOST APPARATUS, CIRCUIT BOARD, LIQUID CONTAINER, AND SYSTEM

(75) Inventor: Shuichi Nakano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 486 days.

(21) Appl. No.: 13/273,034

(22) Filed: Oct. 13, 2011

(65) Prior Publication Data
US 2012/0092696 A1  Apr. 19, 2012

(30) Foreign Application Priority Data

Oct. 15, 2010  (JP) ................................. 2010-232683

(51) Int. Cl.
*B41J 29/393* (2006.01)
(52) U.S. Cl.
USPC ...................... 347/19; 347/5; 347/9
(58) Field of Classification Search
USPC .................................................. 347/5, 9, 19
See application file for complete search history.

(56) References Cited

U.S. PATENT DOCUMENTS

| | | | | |
|---|---|---|---|---|
| 6,749,281 B2 * | 6/2004 | Asauchi | ........................... | 347/19 |
| 2002/0118593 A1 | 8/2002 | Takemae | | |
| 2007/0198886 A1 | 8/2007 | Saito | | |
| 2009/0265602 A1 | 10/2009 | Nakano | | |
| 2010/0257305 A1 | 10/2010 | Asauchi | | |

FOREIGN PATENT DOCUMENTS

| | | |
|---|---|---|
| CN | 101795498 A | 8/2010 |
| EP | 1 728 638 A2 | 12/2006 |
| JP | 2001-187461 A | 7/2001 |
| JP | 2002-259322 A | 9/2002 |
| JP | 2007-199841 A | 8/2007 |
| JP | 2009-259225 A | 11/2009 |
| WO | 2010/002560 A2 | 1/2010 |

* cited by examiner

*Primary Examiner* — Lam S Nguyen
(74) *Attorney, Agent, or Firm* — Kilpatrick Townsend & Stockton LLP

(57) ABSTRACT

The storage apparatus includes a controller which performs a communication process with respect to a host apparatus; a storage unit in which data from the host apparatus are written; and a storage controller which performs access control with respect to the storage unit. The controller receives a command packet and a data packet from the host apparatus. In the case where the write enable bit of the data packet is set to be in a writing permitted state, the controller performs the update commanding of the address information and the write commanding of the data of the data packet. In the case where the write enable bit is set to be in a writing non-permitted state, the controller performs the update commanding of the address information and does not perform the write commanding of the data of the data packet.

14 Claims, 10 Drawing Sheets

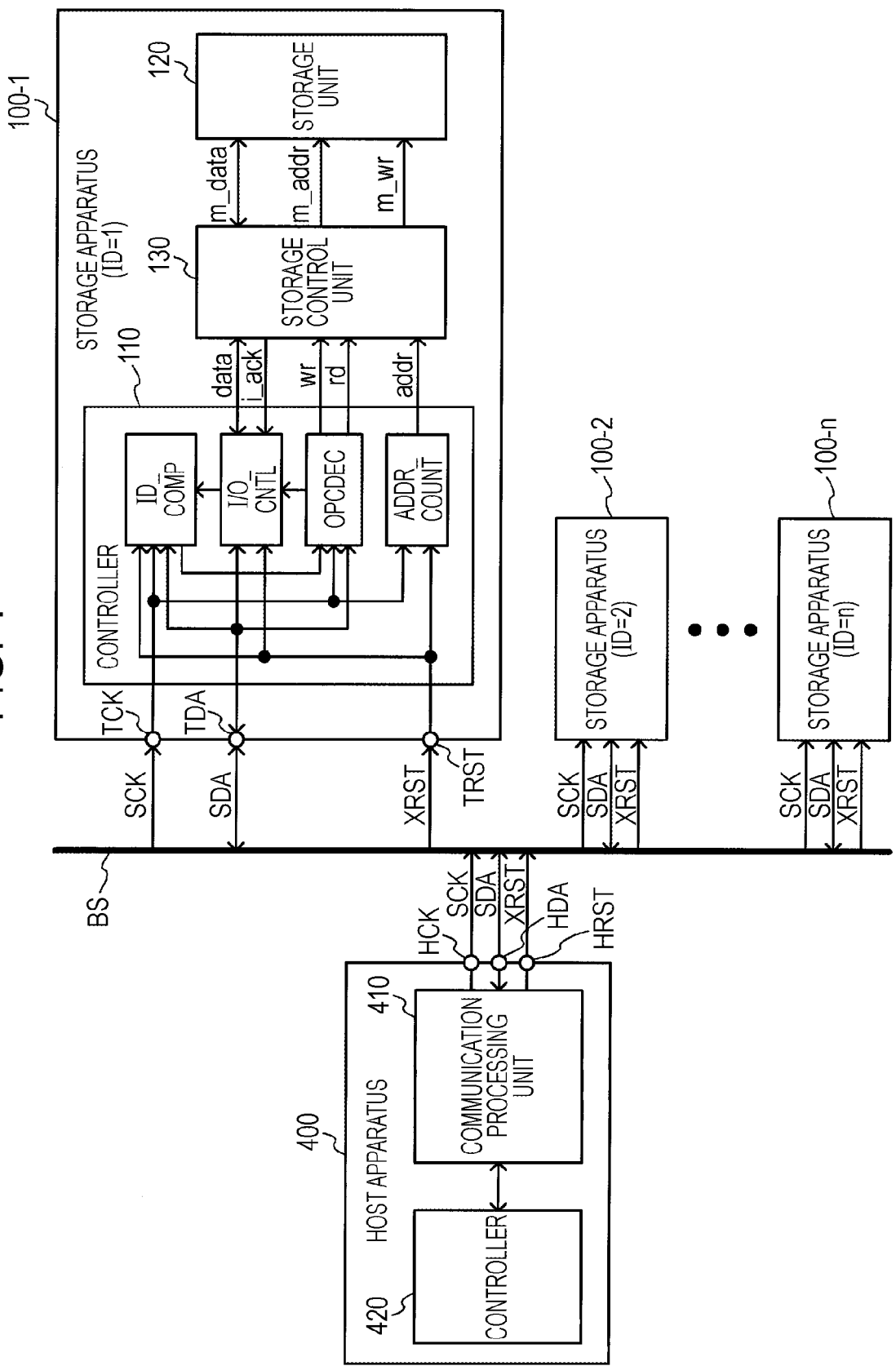

FIG. 3A

| | | D7 | D6 | D5 | D4 | D3 | D2 | D1 | D0 |
|---|---|---|---|---|---|---|---|---|---|
| DPK1 → | A1 | D7 | D6 | D5 | D4 | D3 | D2 | D1 | D0 |
| DPK2 → | A2 | D7 | D6 | D5 | D4 | D3 | D2 | D1 | D0 |
| DPK3 → | A3 | D7 | D6 | D5 | D4 | D3 | D2 | D1 | D0 |
| ⋮ | ⋮ | | | | ⋮ | | | | |
| DPKm → | Am | D7 | D6 | D5 | D4 | D3 | D2 | D1 | D0 |

FIG. 3B

| | | D7 | D6 | D5 | D4 | D3 | D2 | D1 | D0 | WLCK |
|---|---|---|---|---|---|---|---|---|---|---|
| DPK1 → | A1 | D7 | D6 | D5 | D4 | D3 | D2 | D1 | D0 | WLCK |
| DPK2 → | A2 | D7 | D6 | D5 | D4 | D3 | D2 | D1 | D0 | WLCK |
| DPK3 → | A3 | D7 | D6 | D5 | D4 | D3 | D2 | D1 | D0 | WLCK |
| ⋮ | ⋮ | | | | | ⋮ | | | | |
| DPKm → | Am | D7 | D6 | D5 | D4 | D3 | D2 | D1 | D0 | WLCK |

STORAGE APPARATUS, HOST APPARATUS, CIRCUIT BOARD, LIQUID CONTAINER, AND SYSTEM

BACKGROUND

1. Technical Field

The present invention relates to a storage apparatus, a host apparatus, a circuit board, a liquid container, a system, and the like.

2. Related Art

In an ink cartridge (liquid container) used for an ink jet type printer, a storage apparatus is installed. Information on, for example, ink color, an ink consumption amount, or the like is stored in the storage apparatus. Data of the ink consumption amount are transmitted from a printer main body (host apparatus) to the storage apparatus to be written in a non-volatile memory or the like included in the storage apparatus. In this printer, there is a problem in that, if power is shut down, for example, due to electricity stoppage, unplugging from an outlet, or the like, the information on the ink consumption amount or the like may not be written.

In order to solve this problem, for example, JP-A-2001-187461 discloses a technique of writing data necessary for a storage apparatus at the time of power shut down in the storage apparatus. However, in this technique, as the number of the ink cartridges used increases, the total time of the writing process increases. There is a problem in that it is difficult to complete the writing process within a limited power-assured time.

In addition, for example, JP-A-2009-259225 discloses a technique of increasing a speed of a writing process by allowing a host apparatus to deliberately generate data which includes an error and to skip unnecessary data writing by using an error detection function of a storage apparatus. However, in this method, there may be a problem in that the original error detection function may be lost.

SUMMARY

An advantage of some aspects of the invention is to provide a storage apparatus, a host apparatus, a circuit board, a liquid container, a system and the like capable of allowing data for which writing is unnecessary not to be written and reducing the time of the writing process.

According to an aspect of the invention, there is provided a storage apparatus including: a controller which performs a communication process with respect to a host apparatus; a storage unit in which data from the host apparatus are written; and a storage controller which performs access control with respect to the storage unit, wherein the controller receives a command packet and a data packet corresponding to the command packet from the host apparatus, wherein in the case where the write enable bit of the data packet is set to be in a writing permitted state, the controller performs the update commanding of the address information on the storage controller and performs the write commanding of the data of the data packet on the storage controller, and wherein in the case where the write enable bit is set to be in a writing non-permitted state, the controller performs the update commanding of the address information on the storage controller and does not perform the write commanding of the data of the data packet on the storage controller.

According to the above aspect of the invention, the storage apparatus determines based on the state of the write enable bit of the data packet whether or not the writing is permitted, and in the case where the writing is not permitted, the data may not be written. As a result, it is possible to reduce the time of the data writing process of the host apparatus with respect to the storage apparatus.

In addition, it is possible to reduce the problem where the data which are already stored may be destroyed due to an error or the like at the time of writing the data.

In addition, in the above aspect of the invention, the controller may receive first to m-th data packets (m is an integer of two or more) as a data packet corresponding to the command packet, wherein in the case where the write enable bit of the i-th (i is an integer of $1 \leq i \leq m$) data packet among the first to m-th data packets is set to be in a writing permitted state, the controller may perform the update commanding of the address information on the storage controller and perform the write commanding of the data of the i-th data packet on the storage controller, and wherein in the case where the write enable bit of the i-th data packet is set to be in a writing non-permitted state, the controller may perform the update commanding of the address information on the storage controller and may not perform the write commanding of the data of the i-th data packet on the storage controller.

By doing so, the storage apparatus determines based on the state of the write enable bit of the i-th data packet whether or not the writing is permitted, and in the case where the writing is not permitted, the data of the i-th data packet may not be written. As a result, it is possible to reduce the time of the data writing process of the host apparatus with respect to the storage apparatus.

In addition, in the above aspect of the invention, in the case where the write enable bit of the i-th data packet is set to be in a writing non-permitted state, the controller may perform a reception process with respect to the (i+1)-th data packet without waiting for an internal acknowledgement from the storage controller.

By doing so, in the case where the write enable bit of the i-th data packet is set to be in a writing non-permitted state, the storage apparatus may not write the data of the i-th data packet and may proceed to the reception process of the (i+1)-th data packet which is the next data packet. As a result, it is possible to reduce the time of the data writing process of the host apparatus with respect to the storage apparatus.

In addition, in the above aspect of the invention, in the case where the write enable bit of the i-th data packet is set to be in a writing non-permitted state, the controller may determine existence of a communication error with respect to the host apparatus, and in the case where it is determined that no communication error exists, the controller may send the acknowledgement as a reply to the host apparatus.

By doing so, even in the case where the write enable bit is set to be in a writing non-permitted state, since the host apparatus may check the existence of the communication error, it is possible to reduce erroneous writing or the like due to the communication error.

In addition, in the above aspect of the invention, the controller may recognize a bit corresponding to a write lock bit for the data stored in the storage unit among bits of a data field of the i-th data packet as a write enable bit.

By doing so, the number of bits of the data field of the received data packet may be allowed to be equal to the number of bits stored in the storage unit. As a result, since the processes in the controller, the storage controller, or the like may be simplified, it is possible to reduce design costs or manufacturing costs.

In addition, in the above aspect of the invention, the controller may have a first mode and a second mode as operation modes, wherein in the first mode, in the case where the write enable bit of the i-th data packet is set to be in a writing permitted state, the controller may perform the write commanding of the data of the i-th data packet on the storage controller, and in the case where the data of the i-th data packet are normally written in the storage unit, the controller sends an acknowledgement as a reply to the host apparatus, and wherein in the second mode, in the case where the write enable bit of the i-th data packet is set to be in a writing permitted state, the controller may perform the write commanding of the data of the i-th data packet on the storage controller and may not send the acknowledgement as a reply to the host apparatus.

By doing so, in the first mode, since the host apparatus may receive the acknowledgement from the storage apparatus, the host apparatus may determine whether or not the data are normally written in the storage apparatus. In addition, in the second mode, since the host apparatus proceeds to the transmission process with respect to the next storage apparatus without waiting for the acknowledgement as a reply from the storage apparatus, it is possible to reduce the total time of the data writing process with respect to a plurality of the storage apparatuses.

In addition, in the above aspect of the invention, in a first period of the second mode, the controller may receive a first command packet and the first data packet of which the write enable bit is set to be in a writing permitted state and perform the write commanding of the data of the first data packet on the storage controller, and in a second period, the controller may receive a second command packet, the first data packet of which the write enable bit is to be in a writing non-permitted state, and the second data packet, and in the case where the write enable bit of the second data packet is set to be in a writing permitted state, the controller may perform the write commanding of the data of the second data packet on the storage controller.

By doing so, in the first period, the data of the first command packet may be written in the plurality of the storage apparatuses, and thereafter, in the second period, the data of the second command packet may be written in the plurality of the storage apparatuses. By doing so, since data of a specific address may be preferentially written, in the case where the time of the writing process is limited, it is possible to preferentially write particularly important data.

In addition, in the above aspect of the invention, in the second period, when the controller receives the first data packet, the controller may determine existence of the communication error with respect to the host apparatus without performing of the write commanding of the data of the first data packet, and in the case where it is determined that no communication error exists, the controller may send the acknowledgement as a reply to the host apparatus.

By doing so, in the second period, the existence of the communication error may be checked with respect to the first data packet of which the write enable bit is set to be in a writing non-permitted state, it is possible to reduce erroneous writing or the like due to the communication error.

In addition, in the above aspect of the invention, the storage apparatus may include a reset terminal, wherein after the reception of the data packet, in internal acknowledgement waiting period which is a period for waiting for the internal acknowledgement from the storage controller, the controller may determine based on a voltage level of the reset terminal whether the operation mode is the first mode or the second mode.

By doing so, the controller may select any one of the first mode and the second mode based on the voltage level of the reset terminal. Since the voltage level of the reset terminal is set by the host apparatus, the host apparatus may set the operation mode of the storage apparatus.

According to another aspect of the invention, there is provided a host apparatus including: a communication processing unit which is connected to first to n-th storage apparatuses (n is an integer of two or more) to perform a communication process with respect to the first to n-th storage apparatuses (n is an integer of two or more); and a controller which controls the communication processing unit, wherein in the case where the communication processing unit transmits a command packet and a plurality of data packets corresponding to the command packet to a j-th storage apparatus (j is an integer of $1 \leq j \leq n$) among the first to n-th storage apparatuses, the communication processing unit sets the write enable bit of the data packet of which the data are written in a storage unit of the j-th storage apparatus to be in a writing permitted state, and sets the write enable bit of the data packet of which the data are not written in the storage unit of the j-th storage apparatus to be in a writing non-permitted state.

According to the above aspect of the invention, when the host apparatus transmits the data packet to the j-th storage apparatus, the host apparatus may set the write enable bit to be in any one of the writing permitted state and the writing non-permitted state. By doing so, the host apparatus may command the storage apparatus not to write the data of the data packet for which the writing is unnecessary. As a result, it is possible to reduce the time of the data writing process with respect to the storage apparatus. In addition, it is possible to reduce the problem where the data which are already stored may be destroyed due to an error or the like at the time of writing the data.

In addition, in the above aspect of the invention, after the communication processing unit transmits the data packet of which the data are not written to the j-th storage apparatus, in the case where an acknowledgement notifying that no communication error exists is sent as a reply from the j-th storage apparatus, the communication processing unit may transmit the next data packet.

By doing so, after the host apparatus transmits the data packet of which the data are not written, since the host apparatus checks the existence of the communication error, it is possible to reduce erroneous writing due to the communication error.

In addition, in the above aspect of the invention, the communication processing unit may have a first mode and a second mode as the operation modes, wherein in the first mode, after the transmission of the data packet to the j-th storage apparatus, the communication processing unit may proceed to a state of waiting for the acknowledgement as a reply from the j-th storage apparatus, and wherein in the second mode, after the transmission of the data packet to the j-th storage apparatus, the communication processing unit may proceed to a state of transmitting a command packet and a data packet to the (j+1)-th storage apparatus without waiting for the acknowledgement as a reply from the j-th storage apparatus.

By doing so, in the first mode, the host apparatus may receive the acknowledgement from the j-th storage apparatus, the host apparatus may determine whether or not the data are normally written. In addition, in the second mode, since the host apparatus may proceed to the transmission process with respect to the (j+1)-th storage apparatus which is the next storage apparatus without waiting for the acknowledgement as a reply from the j-th storage apparatus, it is possible to reduce the total time of the data writing process with respect to a plurality of the storage apparatuses.

According to still another aspect of the invention, there is provided a circuit board including any one of the aforementioned storage apparatuses.

According to further still another aspect of the invention, there is provided a liquid container including any one of the aforementioned storage apparatuses.

According to yet further still another aspect of the invention, there is provided a system including: a host apparatus; and first to n-th storage apparatuses (n is an integer of two or more) connected to the host apparatus, wherein the host apparatus includes: a communication processing unit which performs a communication process with respect to the first to n-th storage apparatuses; and a host controller which controls the communication processing unit, wherein in the case where the communication processing unit transmits a command packet and first to m-th data packets (m is an integer of two or more) corresponding to the command packet to a j-th storage apparatus (j is an integer of $1 \leq j \leq n$) among the first to n-th storage apparatuses, the communication processing unit sets the write enable bit of the data packet of which the data are written in the j-th storage apparatus to be in a writing permitted state, and sets the write enable bit of the data packet of which the data are not written in the j-th storage apparatus to be in a writing non-permitted state, wherein the j-th storage apparatus includes: a controller which performs a communication process with respect to the host apparatus; a storage unit in which data from the host apparatus are written; and a storage controller which performs access control with respect to the storage unit, wherein in the case where the controller receives the command packet and the first to m-th data packets from the host apparatus, in the case where the write enable bit of the i-th data packet (i is an integer of $1 \leq i \leq m$) among the first to m-th data packets is set to be in a writing permitted state, the controller performs the update commanding of the address information on the storage controller and performs the write commanding of the data of the i-th data packet on the storage controller, and wherein in the case where the write enable bit of the i-th data packet is set to be in a writing non-permitted state, the controller performs the update commanding of the address information on the storage controller and does not perform the write commanding of the data of the i-th data packet on the storage controller.

BRIEF DESCRIPTION OF THE DRAWINGS

The invention will be described with reference to the accompanying drawings, wherein like numbers reference like elements.

FIG. 1 is a diagram illustrating an example of a basic configuration of a storage apparatus and a host apparatus.

FIGS. 3A and 3B are diagrams illustrating a configuration of data stored in a storage unit.

DESCRIPTION OF EXEMPLARY EMBODIMENTS

Figure 2A:
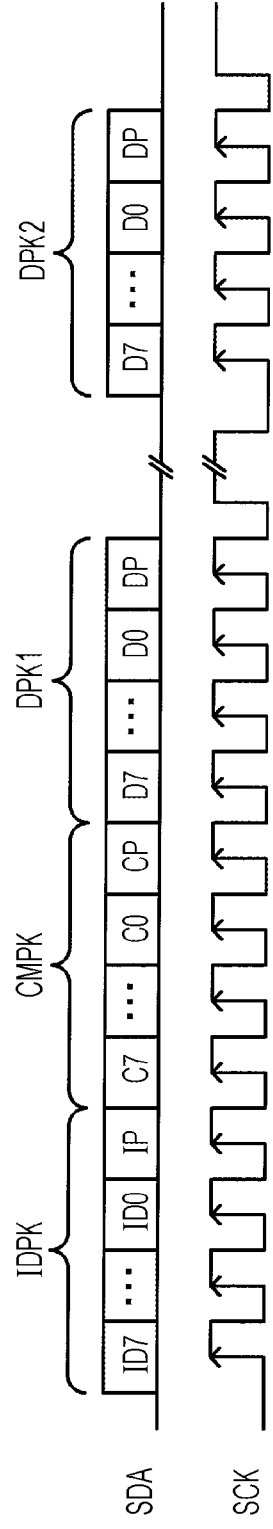
FIGS. 2A and 2B are diagrams illustrating an ID packet, a command packet, and a data packet.

Hereinafter, exemplary embodiments of the invention will be described in detail. In addition, the embodiments described hereinafter do not unduly restrict the invention disclosed in the above-described aspects, and all the configurations described in the embodiments are not necessary solving means of the invention.

1. Storage Apparatus and Host Apparatus

FIG. 1 illustrates an example of a basic configuration of a storage apparatus and a host apparatus according to an embodiment. The storage apparatus 100 according to the embodiment includes a controller 110, a storage unit 120, a storage controller 130, a clock terminal TCK, a data terminal TDA, and a reset terminal TRST. In addition, the host apparatus 400 according to the embodiment includes a communication processing unit 410, a controller 420, a clock terminal HCK, a data terminal HDA, and a reset terminal HRST. In addition, the storage apparatus and the host apparatus according to the embodiment are not limited to the configurations illustrated in FIG. 1, but various modifications may be available. For example, some of the components may be omitted, replaced with other components, or have other components added thereto.

The storage apparatuses 100 (100-1 to 100-n (n is an integer of 2 or more)) are connected through a bus BS to the host apparatus 400. As illustrated in FIG. 1, the bus BS includes for example a clock signal line SCK, a data signal line SDA, and a reset signal line XRST. The host apparatus 400 supplies clocks to the plurality of the storage apparatuses 100-1 to 100-n through the clock signal line SCK. In addition, exchange of data or the like are performed between the host apparatus 400 and each of the storage apparatuses 100 through the data signal line SDA. In addition, the host apparatus 400 outputs a reset signal to the plurality of the storage apparatuses 100-1 to 100-n through a reset signal line XRST.

Each of the storage apparatuses 100-1 to 100-n has ID information. The host apparatus 400 designates the ID information, so that the host apparatus 400 may transmit a command or data to one storage apparatus among the plurality of the storage apparatuses 100-1 to 100-n. For example, in FIG. 1, the ID information on the first storage apparatus 100-1 is ID=1, and the ID information on the second storage apparatus 100-2 is ID=2.

The storage apparatus 100 includes a clock terminal TCK (in a broad sense, a first terminal), a data terminal TDA (in a broad sense, a second terminal), and a reset terminal TRST (in a broad sense, a third terminal). The clock signal line SCK is connected to the clock terminal TCK; the data signal line SDA is connected to the data terminal TDA; and the reset signal line XRST is connected to the reset terminal TRST.

The controller 110 of the storage apparatus 100 performs a communication process with respect to the host apparatus 400 connected through the bus BS. More specifically, for example, as illustrated in FIG. 1, the controller 110 receives the command (the command packet), the writing data (the data packet), or the like which are transmitted through the data signal line SDA from the host apparatus 400 based on the clock and the reset signal from the host apparatus 400. In addition, controller 110 transmits the data which are read from the storage unit 120, the acknowledgement described later, or the like through the data signal line SDA to the host apparatus 400.

The storage unit 120 is a non-volatile memory device of, for example, an EEPROM, a ferroelectric memory, or the like. The data from the host apparatus 400 are written in the storage unit 120. The storage controller 130 performs access control with respect to the storage unit 120.

The controller 110 includes, for example, an ID comparator ID_COMP, an I/O controller I/O_CNTL, an operation code decoder OPCDEC, and an address counter ADDR_COUNT. The ID comparator ID_COMP compares whether or not the ID information transmitted from the host apparatus 400 is equal to the ID information thereof. In the case where the ID information is equal, the ID comparator ID_COMP outputs an enable signal to the operation code decoder OPCDEC, so that the operation code decoder OPCDEC decodes a command (an operation code) transmitted from the host apparatus 400. On the other hand, in the case where ID information transmitted from the host apparatus 400 is not equal to the ID information thereof, the transmitted command is neglected.

More specifically, in the case where the command transmitted from the host apparatus 400 is a writing command, the I/O controller I/O_CNTL receives the writing data from the host apparatus 400. The storage controller 130 writes the received writing data as memory data m_data in the storage unit 120 based on a writing command wr from the operation code decoder OPCDEC. The address information addr of the writing time is generated based on the clock from the host apparatus 400 by the address counter ADDR_COUNT, and the writing data are written in the subsequent addresses of the storage unit 120 sequentially, in other words, in the transmission order. In the case where the writing data are normally written in the storage unit 120, the storage controller 130 outputs an internal acknowledgement i_ack to the I/O controller I/O_CNTL.

In the case where the command transmitted from the host apparatus 400 is a read command, the storage controller 130 reads the memory data m_data from the storage unit 120 based on a reading command rd from the operation code decoder OPCDEC. The address information addr of the reading time is also generated based on the clock from the host apparatus 400 by the address counter ADDR_COUNT and is read sequentially.

In the storage apparatus 100 according to the embodiment, the controller 110 may determines based on the write enable bit WE of the received data packet whether to write the data of the data packet. In other words, in the case where the controller 110 receives the command packet and the data packet corresponding to the command packet from the host apparatus 400, in the case where the write enable bit WE of the data packet is set to be in a writing permitted state (for example, WE=1), the update commanding of the address information addr is performed on the storage controller 130, and the write commanding of the data wr of the data packet is performed on the storage controller 130. On the other hand, in the case where the write enable bit WE is set to be in a writing non-permitted state (for example, WE=0), the update commanding of the address information addr is performed on the storage controller 130, but the write commanding of the data wr of the data packet is not performed on the storage controller 130. By doing so, the storage apparatus 100 determines based on the state of the write enable bit WE whether or not the writing is permitted. Without the writing of the data packet of which the writing is not permitted, the storage apparatus 100 may proceed to the reception process and the writing process with respect to the next data packet. As a result, it is possible to reduce the time of the data writing process with respect to the storage apparatus 100. In addition, the data writing process will be described in detail.

Furthermore, the controller 110 has first and second modes (first and second operation modes) as the operation modes. In the first mode, in the write enable bit WE is set to be in a writing permitted state, the write commanding of the data wr is performed on the storage controller 130, and in the case where the data of the data packet is normally written in the storage unit 120, the controller 110 sends an acknowledgement ACK as a replay to the host apparatus 400. The acknowledgement ACK is used to notify the host apparatus 400 that the data are normally written in the storage unit 120. On the other hand, in the second mode, in the case where the write enable bit WE is set to be in a writing permitted state, the write commanding of the data wr is performed on the storage controller 130, but the acknowledgement ACK as a reply is not sent to the host apparatus 400. In the second mode, although the host apparatus 400 may not recognize whether or not the data are normally written in the storage apparatus, it is possible to reduce the total time of the data writing process with respect to the plurality of the storage apparatuses connected to the bus as described later. In addition, the data writing processes in the first and second modes will be described in detail.

The aforementioned operation modes (first and second modes) are set based on the later-described operation mode of the communication processing unit 410 of the host apparatus 400. In other words, after the reception of the data packet, in the internal acknowledgement waiting period IAKW which is the period of waiting for the internal acknowledgement i_ack from the storage controller 130, the controller 110 determines based on the voltage level of the reset terminal TRST whether the operation mode is the first mode or the second mode.

The operation modes (first and second modes) of the controller 110 may be implemented with, for example, a state machine or the like. More specifically, the state machine is subject to state transition based on the input of the writing command, the internal acknowledgement i_ack, the voltage level (reset signal) of the reset terminal TRST, or the like to output a predetermined command (for example, a data writing command, an acknowledgement ACK reply command, or the like) according to the state of the transition site.

The host apparatus 400 includes a communication processing unit 410, a controller 420, a clock terminal HCK, a data terminal HDA, and a reset terminal HRST. The communication processing unit 410 performs the communication process with respect to the first to the n-th storage apparatuses 100-1 to 100-n which are connected through the bus BS. The controller 420 controls the communication processing unit 410.

In the case where the communication processing unit 410 transmits the command packets and the plurality of the data packets corresponding to the command packets to the j-th storage apparatus 100-j, (j is an integer of $1 \leq j \leq n$) among the first to n-th storage apparatuses 100-1 to 100-n, the communication processing unit 410 may allow the writing of the data of the data packet to be permitted or not by setting the write enable bit WE of the data packet. In other words, with respect to the data packet of which the data are written in the storage unit 120 of the j-th storage apparatus 100-j, the write enable bit WE is set to be in a writing permitted state (for example, WE=1); and with respect to the data packet of which the data are not written, the write enable bit WE is set to be in a writing non-permitted state (for example, WE=0). By doing so, with respect to the data packet for which the writing is unnecessary, the host apparatus 400 sets the write enable bit WE to be in a writing non-permitted state, and the storage apparatus 100 which receives the data packet proceeds to the reception process and the writing process with respect to the next data packet without performing of the writing the data packet for which the writing is unnecessary based on the setting of the write enable bit WE. As a result, it is possible to reduce the time of the data writing process with respect to the storage apparatus.

In addition, after the communication processing unit 410 transmits the data packet of which the data are not written to the j-th storage apparatus 100-j, the communication processing unit 410 may transmit the next data packet in the case where the acknowledgement ACK notifying that no communication error exists is sent as a reply from the j-th storage apparatus 100-j. By doing so, after the host apparatus 400 checks that no communication error occurs, the host apparatus 400 may proceed to the transmission process with respect to the next data packet.

Furthermore, the communication processing unit 410 has first and second modes (first and second operation modes) as operation modes. In the first mode, after the transmission of the data packet to the j-th storage apparatus 100-j, the communication processing unit 410 proceeds to the state of waiting for the acknowledgement ACK as a reply from the j-th storage apparatus 100-j. Next, after the communication processing unit 410 receives the acknowledgement ACK from the j-th storage apparatus 100-j, the communication processing unit 410 transmits the command packet and the data packet to the (j+1)-th storage apparatus 100-(j+1). The host apparatus 400 may recognize based on the reception of the acknowledgement ACK that the data are normally written in each of the storage apparatuses.

On the other hand, in the second mode, after the transmission of the data packet to the j-th storage apparatus 100-j, the communication processing unit 410 proceeds to the state of transmitting the command packet and the data packet to the (j+1)-th storage apparatus 100-(j+1) without waiting for the acknowledgement ACK as a reply from the j-th storage apparatus 100-j. In the second mode, although the host apparatus 400 may not recognize whether or not the data are normally written in each of the storage apparatuses, as described later, it is possible to reduce the total time of the data writing process with respect to the plurality of the storage apparatuses which are connected to the bus.

In the second mode, after the transmission of the data packet to the j-th storage apparatus 100-j, the communication processing unit 410 sets the voltage level of the reset terminal HRST to the logic level indicating the reset to notify the j-th storage apparatus 100-j that the operation mode is the second mode. Next, in the internal acknowledgement waiting period IAKW, the controller 110 of the j-th storage apparatus 100-j determines based on the voltage level of the reset terminal TRST whether the operation mode is the first mode or the second mode.

In this manner, in the storage apparatus and the host apparatus according to the embodiment, the write enable bit WE of the data packet which is transmitted from the host apparatus to the storage apparatus may be set to be in a writing permitted state or a writing non-permitted state. Next, the storage apparatus determines based on the write enable bit WE of the received data packet whether to write the data in the storage unit. In the case where the writing is not permitted, the data are not written, but the storage apparatus may proceed to the reception process and the writing process of the next data packet. As a result, it is possible to reduce the time of the data writing process with respect to the storage apparatus. In addition, since the writing process is not performed on the data for which the writing is unnecessary, it is possible to reduce the problem where the data which are already stored may be destroyed due the error or the like at the time of writing the data.

Furthermore, in the storage apparatus and the host apparatus according to the embodiment, in the first mode, since the host apparatus may receive the acknowledgement ACK from the storage apparatus, it is possible to determine whether or not the data are normally written in the storage apparatus. In addition, in the second mode, since the host apparatus may proceed to the transmission process with respect to the next storage apparatus without waiting for the acknowledgement ACK as a reply from the storage apparatus, it is possible to reduce the total time of the data writing process with respect to a plurality of the storage apparatuses.

Figure 2B:
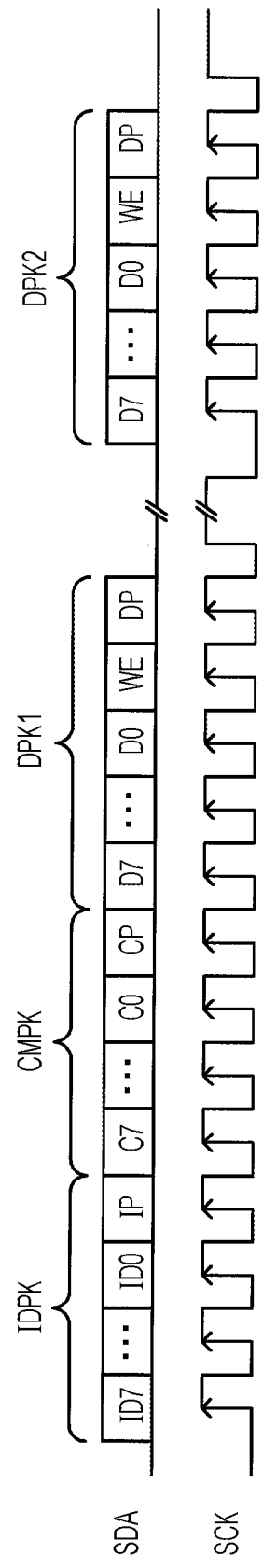

FIGS. 2A and 2B are diagrams illustrating an ID packet, a command packet, and a data packet which are transmitted from the host apparatus to the storage apparatus. FIG. 2A illustrates a data packet which does not include a write enable bit WE as a comparative example, and FIG. 2B illustrates a data packet including a write enable bit WE which is used in the storage apparatus 100 and the host apparatus 400 according to the embodiment.

As illustrated in FIGS. 2A and 2B, the ID packet IDPK is a packet regarding the ID information on the storage apparatus 100. The ID packet IDPK is constructed with, for example, eight bits of ID0 to ID7, and a parity bit IP is added to thereto. In addition, the command packet CMPK is constructed with, for example, eight bits of C0 to C7, and a parity bit CP is added thereto. In addition, the data packet DPK includes a data portion which is constructed with eight bits of D0 to D7. In the storage apparatus and the host apparatus according to the embodiment, the data packet DPK includes a write enable bit WE and further includes a parity bit DP. Each of the parity bits IP, CP, and DP is a bit added for the parity check. The bit is added so that the number of is always an even number or an odd number.

The packets are transmitted in synchronization with a clock SCK in the order of the ID packet IDPK, the command packet CMPK, and the data packet DPK. In the case of transmitting a plurality of the data packets, after the transmission of the first data packet DPK1, a period for sending the aforementioned acknowledgement ACK as a reply is provided, and thereafter, the second data packet DPK2 is transmitted.

In addition, in the storage apparatus and the host apparatus according to the embodiment, the configuration of each packet is not limited to the configuration illustrated in FIG. 2B, but various modifications may be available. For example, some of the components may be omitted, replaced with other components, or have other components added thereto. For example, the number of bits of each packet may be increased or decreased, or the order of the write enable bit WE may be changed. In addition, the write enable bit WE may be constructed with not one bit but a plurality of bits.

FIGS. 3A and 3B are diagrams illustrating a configuration (memory map) of the data stored in the storage unit 120. As illustrated in FIG. 3A, for example, the storage unit 120 has first to m-th addresses A1 to Am (m is an integer of 2 or more), so that each address may stores eight-bit data D0 to D7.

The first to m-th data packets DPK1 to DPKm received by the storage apparatus 100 are written in the storage unit 120 in the reception order (sequentially). In other words, the first data packet DPK1 is written in first address A1, and the second data packet DPK2 is written in the second address A2. Similarly, the third to m-th data packets DPK3 to DPKm are written in the third to m-th addresses A3 to Am, respectively. Every time when the data packet is received, the address information addr of the writing time is updated (incremented) according to an update command of an address counter ADDR_COUNT of the controller 110.

As described above, in the storage apparatus and the host apparatus according to the embodiment, in the case where the write enable bit WE of the data packet DPK is set to be in a writing non-permitted state, although the update commanding (incrementing) of the address information addr is performed, the data writing is not performed. More specifically, in the case where the controller 110 receives the first to m-th data packets DPK1 to DPKm corresponding to the command packet CMPK, in the case where the write enable bit WE of the i-th data packet DPKi among the DPK1 to the DPKm (i is an integer of 1≤i≤m) is set to be in a writing permitted state, the update commanding (for example, incrementing) of the address information addr is performed on the storage controller 130, and the write commanding of the data of the i-th data packet DPKi is performed on the storage controller 130. In the case where the write enable bit WE of the i-th data packet DPKi is set to be in a writing non-permitted state, the update commanding of the address information addr is performed on the storage controller 130, and the write commanding of the data of the i-th data packet DPKi is not performed on the storage controller 130. By doing so, the storage apparatus 100 does not perform the data writing process of the DPKi which is set to be in the writing non-permitted state, so that the storage apparatus 100 may proceed to the reception process of the next data packet DPK(i+1). Therefore, in the case where the DPK(i+1) is in the writing permitted state, the data of the DPK(i+1) may be written in the next address A(i+1).

FIG. 3B illustrates a configuration of the case of including the write lock bit WLCK as a configuration of the data of the storage unit 120. The write lock bit WLCK is a bit which is disposed in each address to be used for setting the writing prohibition (write lock) for the address. For example, in the case where the write lock bit WLCK of the address A1 is set to 1, the writing of the address A1 is prohibited by the storage controller 130. In general, the write lock bit WLCK is set to the state of the shipping time at a factory, and thereafter, the write lock bit WLCK may not be rewritten.

In this manner, the write lock bit WLCK is not a bit which may be written by the host apparatus 400. However, among the data packets the bit corresponding to the write lock bit WLCK may be used as the write enable bit WE. In other words, among the bits of the data field of the i-th data packet DPKi, the controller 110 may recognize the bit corresponding to the write lock bit WLCK of the data stored in the storage unit 120 as the write enable bit WE. By doing so, the number of the bits (for example, nine bits of D0 to D7 and WE in FIG. 2B) of the data field of the received data packet becomes equal to the number of the bits (for example, nine bits of D0 to D7 and WLCK in FIG. 3B) stored in one address of the storage unit 120. As a result, since it is possible to simplify the processes of the controller 110 and the storage controller 130, so that it is possible to reduce design costs or manufacturing costs.

In addition, the configuration of the storage unit according to the embodiment is not limited to the configuration illustrated in FIGS. 3A and 3B, but various modifications may be available. For example, some of the components may be omitted, replaced with other components, or have other components added thereto. For example, the number of bits stored in one address may be increased or decreased, or the order of the write lock bit WLCK may be changed. In addition, the write lock bit WLCK may be constructed with not 1 bit but a plurality of bits.

2. Writing Process in First Mode

Figure 4:
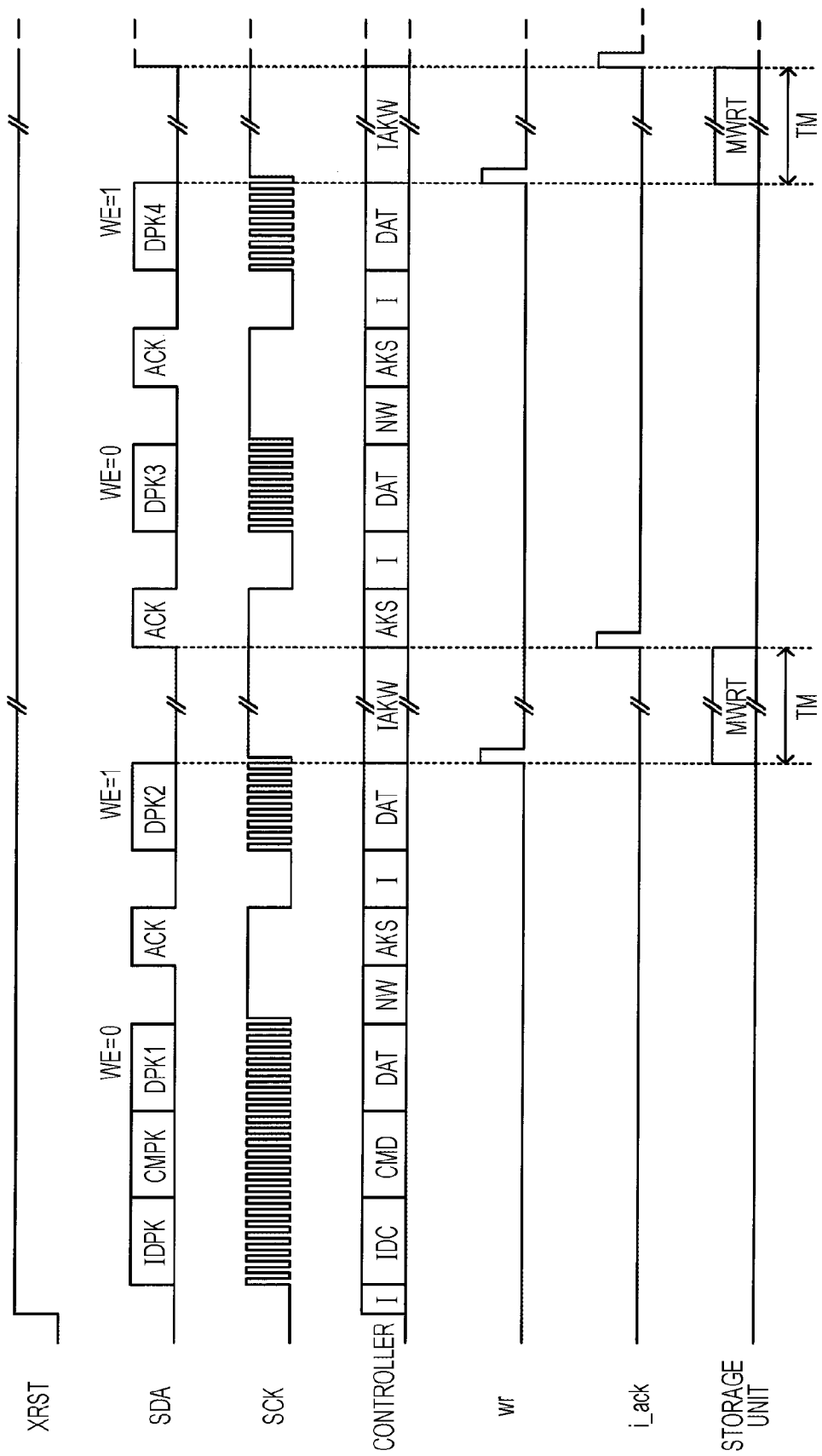
FIG. 4 is a timing chart illustrating a writing process in a first mode.

FIG. 4 illustrates a timing chart of a writing process in a first mode of the storage apparatus and the host apparatus according to the embodiment. FIG. 4 illustrates signal waveforms of the reset signal XRST, the clock signal SCK, and the data signal SDA and the operation states and signal waveforms of the internal signals wr and i_ack of the controller 110 and the storage unit 120 of the storage apparatus 100.

In FIG. 4, I denotes an idle period; IDC denotes an ID recognition period; CMD denotes a command recognition period; DAT denotes a data reception period; IAKW denotes a internal acknowledgement waiting period; MWRT denotes a memory writing period; AKS denotes an acknowledgement replying period; and NW denotes a period where, in the case where the received data packet is set to be in the writing non-permitted state, the writing process is not performed and the existence of the communication error is determined.

In FIG. 4, as an example, the write enable bits WE of the first and third data packets DPK1 and DPK3 are set to be in a writing non-permitted state (WE=0), and the write enable bits WE of the second and fourth data packets DPK2 and DPK4 are set to be in a writing permitted state (WE=1).

First, the host apparatus 400 releases the reset of the storage apparatus by setting the reset signal XRST from the L level (low voltage level, in a broad sense, a second logic level) to the H level (high voltage level, in a broad sense, a first logic level). Next, the controller 110 enters an idle state.

Next, the host apparatus 400 transmits the ID packet IDPK, the command packet CMPK, and the data packet DPK1 to the storage apparatus 100, and thereafter, proceeds to the state in which the host apparatus 400 waits for the acknowledgement ACK as a reply from the storage apparatus 100.

In the ID recognition period IDC, the ID comparator ID_COMP of the storage apparatus 100 recognizes that the received ID information is coincident with the ID information thereof. Subsequently, in the command recognition period CMD, the operation code decoder OPCDEC recognizes that the received command is a writing command. In the next data reception period DAT, the I/O controller I/O_CNTL receives the data packet DPK1 and determines whether or not the write enable bit WE is set to be in a writing permitted state.

As illustrated in FIG. 4, in the case where the write enable bit WE of the DPK1 is set to be in a writing non-permitted state (WE=0), the controller 110 does not perform the writing commanding on the storage controller 130. Next, the controller 110 checks the existence of a communication error. In the case where it is determined that no communication error exists, the controller 110 sends the acknowledgement ACK as a reply to the host apparatus 400. After the reception of the acknowledgement ACK notifying that no communication error exists, the host apparatus 400 transmits the second data packet DPK2. In the case where the write enable bit WE of the first data packet DPK1 (in a broad sense, the i-th data packet DPKi) is set to be in a writing non-permitted state, the controller 110 performs the process of receiving the second data packet DPK2 (in a broad sense, the (i+1)-th data packet DPK(i+1)) without waiting for the internal acknowledgement i_ack from the storage controller 130.

Since the write enable bit WE of the second data packet DPK2 is set to be in a writing permitted state, after the reception of the DPK2, the controller 110 performs the writing commanding wr on the storage controller 130. In the memory writing period MWRT, the storage unit 120 writes the data based on the writing commanding wr. In the memory writing period MWRT, the controller 110 is in the internal acknowledgement waiting period IAKW, so that the controller 110 waits for the outputting of the internal acknowledgement signal i_ack from the storage controller 130. In the case where the data are normally written, the storage controller 130 outputs the internal acknowledgement signal i_ack to the controller 110. If the controller 110 receives the internal acknowledgement signal i_ack, the controller 110 sends the acknowledgement ACK as a reply to the host apparatus 400. After the host apparatus 400 receives the acknowledgement ACK, the host apparatus 400 transmits the third data packet DPK3.

Since the write enable bit WE of the DPK3 is set to be in a writing non-permitted state, after the reception of the DPK3, the controller 110 checks the existence of a communication error. In the case where it is determined that no communication error exists, the controller 110 sends the acknowledgement ACK as a reply to the host apparatus 400. After the host apparatus 400 receives the acknowledgement ACK notifying that no communication error exists, the host apparatus 400 transmits the fourth data packet DPK4.

Since the write enable bit WE of the DPK4 is set to be in a writing permitted state, after the reception of the DPK4, the controller 110 performs the writing commanding wr on the storage controller 130. In the memory writing period MWRT, the storage unit 120 writes the data based on the writing commanding wr. In the case where the data are normally written, the storage controller 130 outputs a internal acknowledgement signal i_ack to the controller 110. If the controller 110 receives the internal acknowledgement signal i_ack, the controller 110 sends the acknowledgement ACK as a reply to the host apparatus 400.

Figure 5:
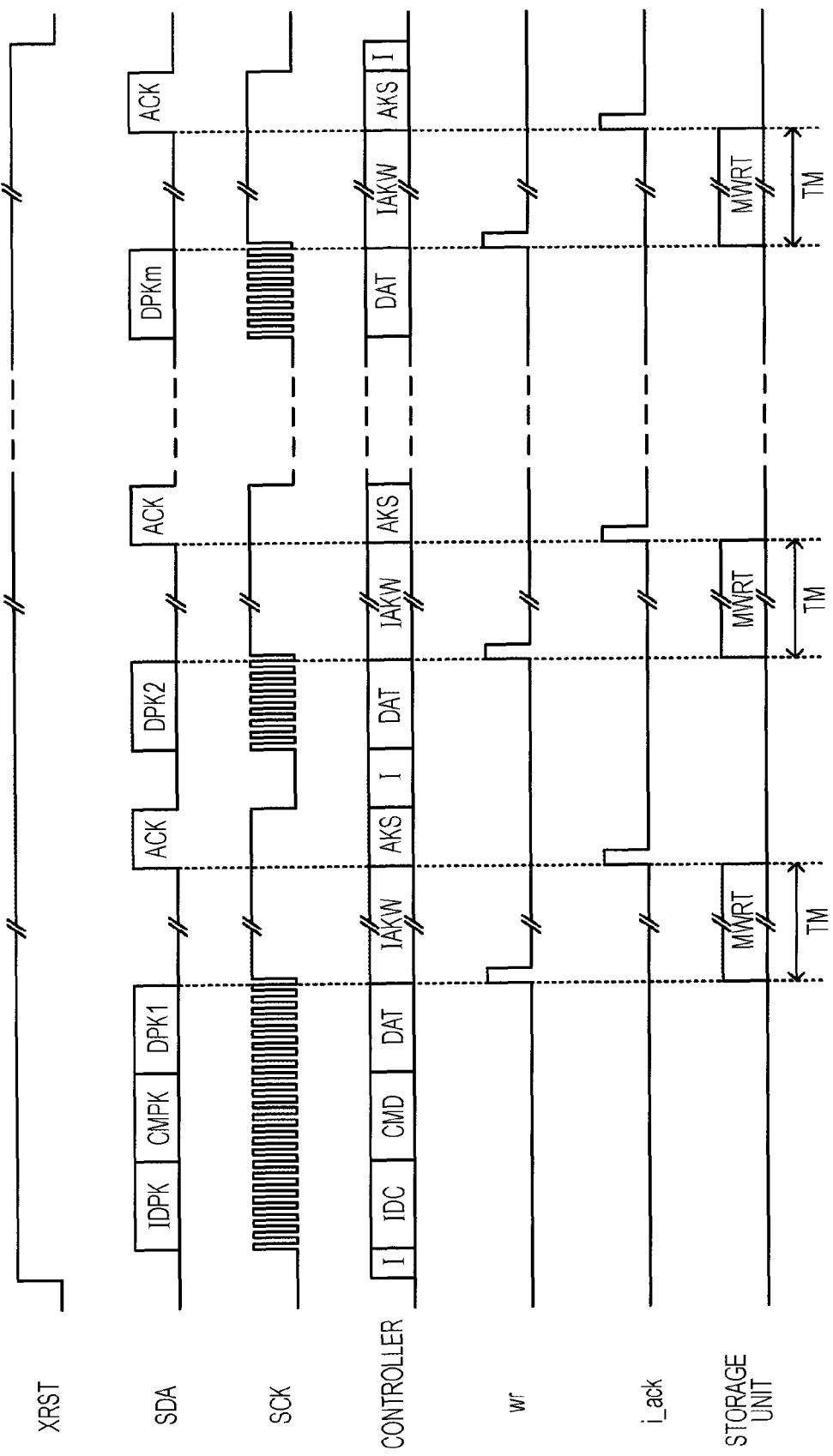
FIG. 5 is a timing chart illustrating a writing process in a configuration where a write enable bit is not included.

FIG. 5 illustrates a timing chart of the writing process in the configuration where a write enable bit WE is not included as a comparative example. In the comparative example of FIG. 5, a memory writing period MWRT is necessary to each of the m data packets DPK1 to DPKm. While the time necessary for transmission of the data packet is, for example, about 100 µs, the length TM (necessary writing time) of the memory writing period MWRT is about 5 ms. Therefore, in the case where the m data packets DPK1 to DPKm are written, the time of the writing process becomes at least m×TM.

On the other hand, in the storage apparatus and the host apparatus according to the embodiment, the data packet which is to be necessarily written may be selectively written. In other words, since the write enable bit WE may be limited to the data packet which is set to be in a writing permitted state during the data writing, it is possible to reduce the time of the writing process.

3. Writing Process in Second Mode

As described above, although the time of the writing process may be reduced in the first mode of the storage apparatus and the host apparatus according to the embodiment, in the second mode, it is possible to further reduce the time of the writing process with respect to a plurality of the storage apparatuses which are connected to a bus.

Figure 6:
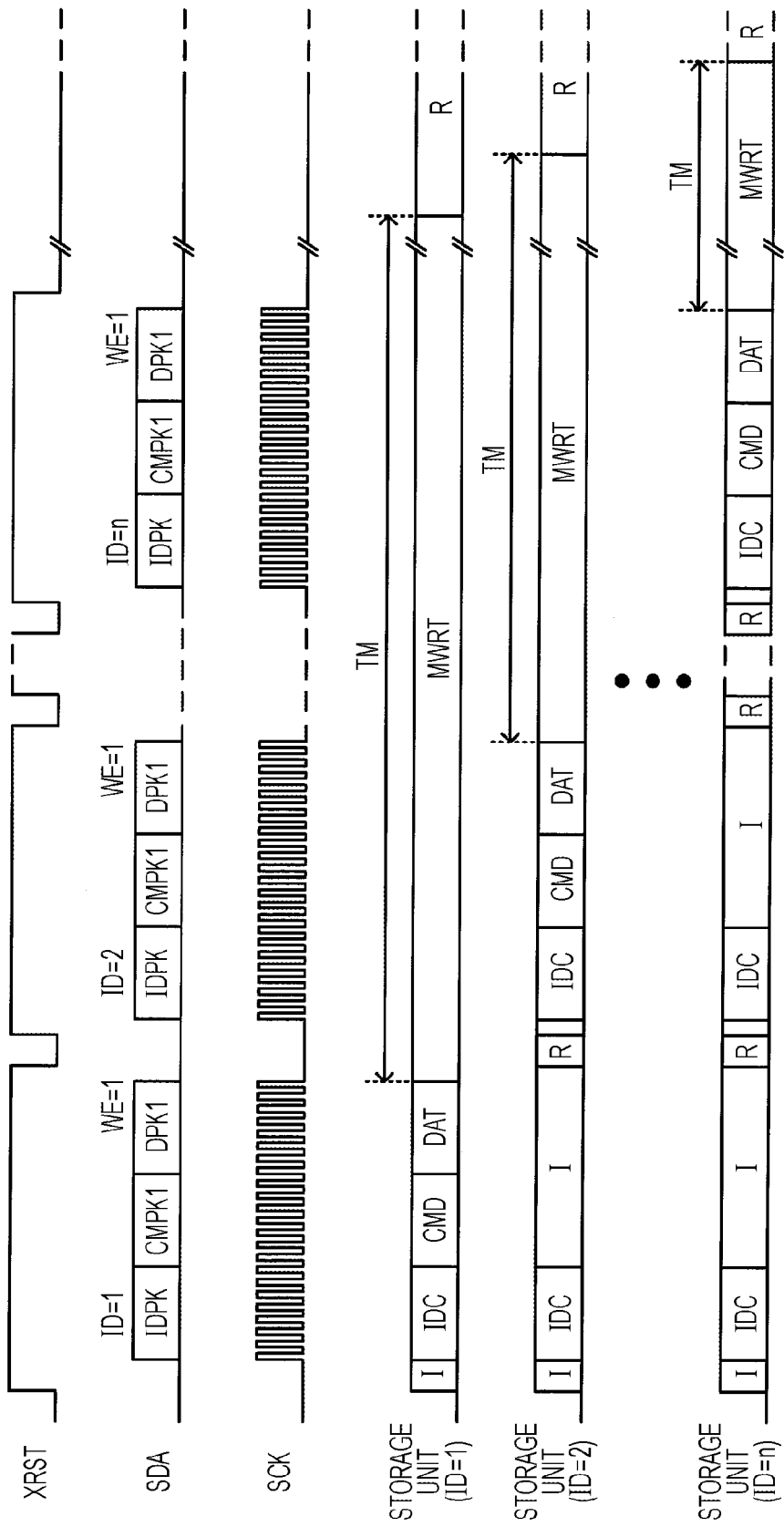
FIG. 6 is a timing chart illustrating a first period of a writing process in a second mode.

FIG. 6 is a timing chart illustrating a first period of a writing process in a second mode of the storage apparatus and the host apparatus according to the embodiment. FIG. 6 illustrates signal waveforms of the reset signal XRST, the clock signal SCK, and the data signal SDA and operation states of the first to n-th storage apparatuses 100-1 to 100-n (ID=1~n) (n is an integer of two or more). In addition, in FIG. 6, I, IDC, CMD, DAT, MWRT, and R denote an idle period, an ID recognition period, a command recognition period, a data reception period, a memory writing period, and a reset period, respectively.

First, the host apparatus 400 transmits the ID packet IDPK, the first command packet CMPK1, and the first data packet DPK1 to the first storage apparatus (ID=1). The controller 110 of the first storage apparatus (ID=1) receives the first command packet CMPK1 and the first data packet DPK1 where the write enable bit WE is set to be in a writing permitted state (WE=1) and performs the write commanding of the data of the first data packet DPK1 on the storage controller 130. Next, in the memory writing period MWRT, the controller 110 writes the data in the storage unit 120 of the first storage apparatus (ID=1).

Unlike the first mode, in the second mode, in the case where the data are normally written, the controller 110 does not send the acknowledgement ACK as a reply to the host apparatus 400. In addition, in the second mode, after the transmission of the data packet to the first storage apparatus (in a broad sense, the j-th storage apparatus), the communication processing unit 410 of the host apparatus 400 proceeds to the state of transmitting the command packet and the data packet to the second storage apparatus (in a broad sense, the (j+1)-th storage apparatus) without waiting for the acknowledgement ACK as a reply from the first storage apparatus.

In this manner, after the transmission of the first data packet DPK1 to the first storage apparatus, the host apparatus 400 transmits the IDPK, the CMPK1, and the DPK1 to the second storage apparatus without waiting for the ending of the memory writing period MWRT. Thereafter, similarly, the host apparatus 400 transmits the first data packet DPK1 to the third to n-th storage apparatuses.

In the second mode, after the transmission of the data packet to the j-th storage apparatus, the communication processing unit 410 of the host apparatus 400 sets the voltage level of the reset terminal HRST to the logic level (for example, the L level in FIG. 6) indicating the reset to notify the j-th storage apparatus that the operation mode is the second mode. After the reception of the data packet, in the internal acknowledgement waiting period IAKW (that is, the memory writing period MWRT) which is the period for waiting for the internal acknowledgement i_ack from the storage controller 130, the controller 110 of the j-th storage apparatus may determine based on the voltage level of the reset terminal TRST whether the operation mode is the first mode or the second mode.

As described hereinbefore, in the first period of the second mode, the process of transmitting the first data packet DPK1 to each of the storage apparatuses 100 of the first to n-th storage apparatuses and writing the data of the first data packet DPK1 in the first address A1 of each of the storage units 120 is performed. In the case where the same process is performed in the first mode, at least the time (n×TM) which is n times the length TM (necessary writing time) of the memory writing period MWRT is necessary as the total time of the writing process. However, in the second mode, since a plurality of the memory writing processes are performed simultaneously, the total time of the writing process may be TM+ (packet transmission time). As described above, while the packet transmission time is, for example, about 100 µs, the length TM of the memory writing period MWRT is about 5 ms. Therefore, in the case where the data are written in a plurality of the storage apparatuses, it is possible to reduce the total time of the writing process by using the second mode.

Figure 7:
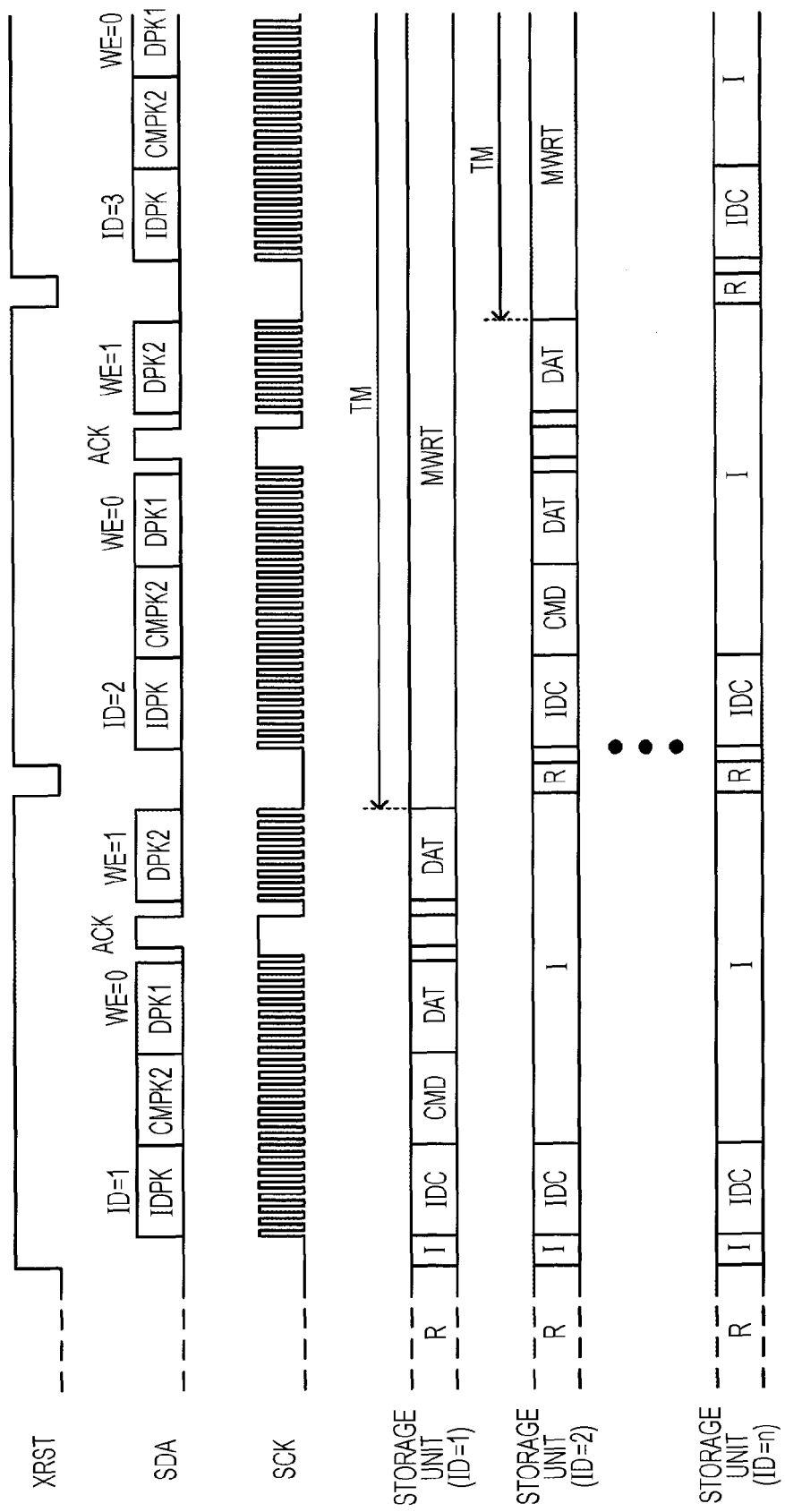
FIG. 7 is a timing chart illustrating a starting portion of a second period of the writing process in the second mode.

FIG. 7 is a timing chart illustrating a starting portion of the second period of the writing process in the second mode. In the second period, the process of writing the data of the second data packet DPK2 in each of the storage apparatuses 100 of the first to the n-th storage apparatuses is performed. In addition, the reference numerals of FIG. 7 are the same as those of FIG. 6, and the description thereof is omitted herein.

At the starting portion of the second period, the host apparatus 400 transmits the ID packet IDPK, the second command packet CMPK2, and the first and the second data packets DPK1 and DPK2 sequentially to the first storage apparatus (ID=1). The write enable bit WE of the DPK1 is set to be in a writing non-permitted state (WE=0), and the write enable bit WE of DPK2 is set to be in a writing permitted state (WE=1).

The first storage apparatus receives the first and the second data packets DPK1 and DPK2, and in the case where the write enable bit of the second data packet DPK2 is set to be in a writing permitted state, the first storage apparatus performs the write commanding of the data of the DPK2. Next, in the memory writing period MWRT, the first storage apparatus writes the data of the DPK2 in the storage unit 120. In addition, when the controller 110 receives the first data packet DPK1 which is set to be in a writing non-permitted state, the controller 110 sends the acknowledgement ACK notifying that no communication error exists as a reply to the host apparatus 400 without performing the write commanding of the data of the DPK1.

After the transmission of the second data packet DPK2 to the first storage apparatus, the communication processing unit 410 of the host apparatus 400 proceeds to the state of transmitting the ID packet, the command packet and the data packet to the second storage apparatus without waiting for the acknowledgement ACK as a reply from the first storage apparatus. Next, the second storage apparatus receives the first and the second data packets DPK1 and DPK2 and, similarly to the above description, in the memory writing period MWRT, the second storage apparatus writes the data of the DPK2 in the storage unit 120.

Figure 8:
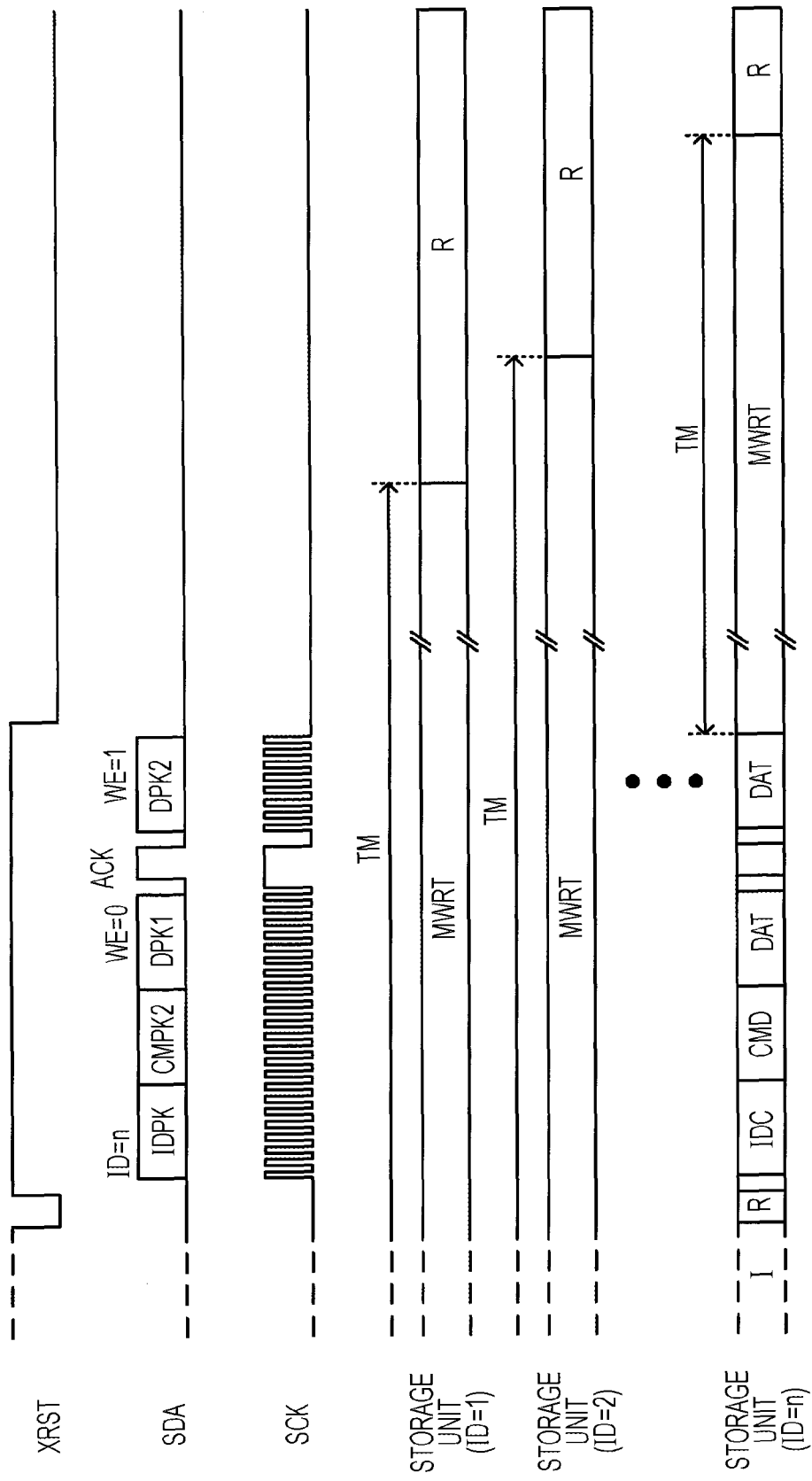
FIG. 8 is a timing chart illustrating an ending portion of the second period of the writing process in the second mode.

FIG. 8 is a timing chart illustrating an ending portion of the second period of the writing process in the second mode. The host apparatus 400 transmits the ID packet IDPK, the second command packet CMPK2, and the first and the second data packets DPK1 and DPK2 to the final storage apparatus, that is, the n-th storage apparatus (ID=n), and in the memory writing period MWRT, the n-th storage apparatus writes the data of the DPK2 in the storage unit 120. In this manner, the process of writing the data of the second data packet DPK2 in each of the storage apparatuses 100 of the first to the n-th storage apparatuses is performed.

As described hereinbefore, in the second period of the second mode, the process of writing the data of the second data packet DPK2 in each of the storage apparatuses 100 of the first to the n-th storage apparatuses is performed. In the case where the same process is performed in the first mode, at least the time (n×TM) which is n times the length TM (necessary writing time) of the memory writing period MWRT is necessary as the total time of the writing process. However, in the second mode, since a plurality of the memory writing processes are performed simultaneously, the total time of the writing process may be TM+(packet transmission time). As described above, while the packet transmission time is, for example, about 100 μs, the length TM (necessary writing time) of the memory writing period MWRT is about 5 ms. Therefore, in the case of writing the data in a plurality of the storage apparatuses, it is possible to reduce the total time of the writing process by using the second mode.

In addition, according to the second mode, since the data of a specific address (for example, in FIGS. 7 and 8, data of the first and second addresses) may be preferentially written in each of the storage apparatuses, in the case where the time of the writing process is limited, particularly important data may be preferentially written.

In addition, although the data of the first and the second data packets DPK1 and DPK2 are written in the writing process in the second mode illustrated in FIGS. 7 and 8, the same writing process may also be performed on different data packets. For example, in the case where the data of DPK3 are written, the DPK1 and the DPK2 may be set to be in a writing non-permitted state. In addition, one of the first and second periods may be omitted.

4. System, Liquid Container, and Circuit Board

Figure 9:
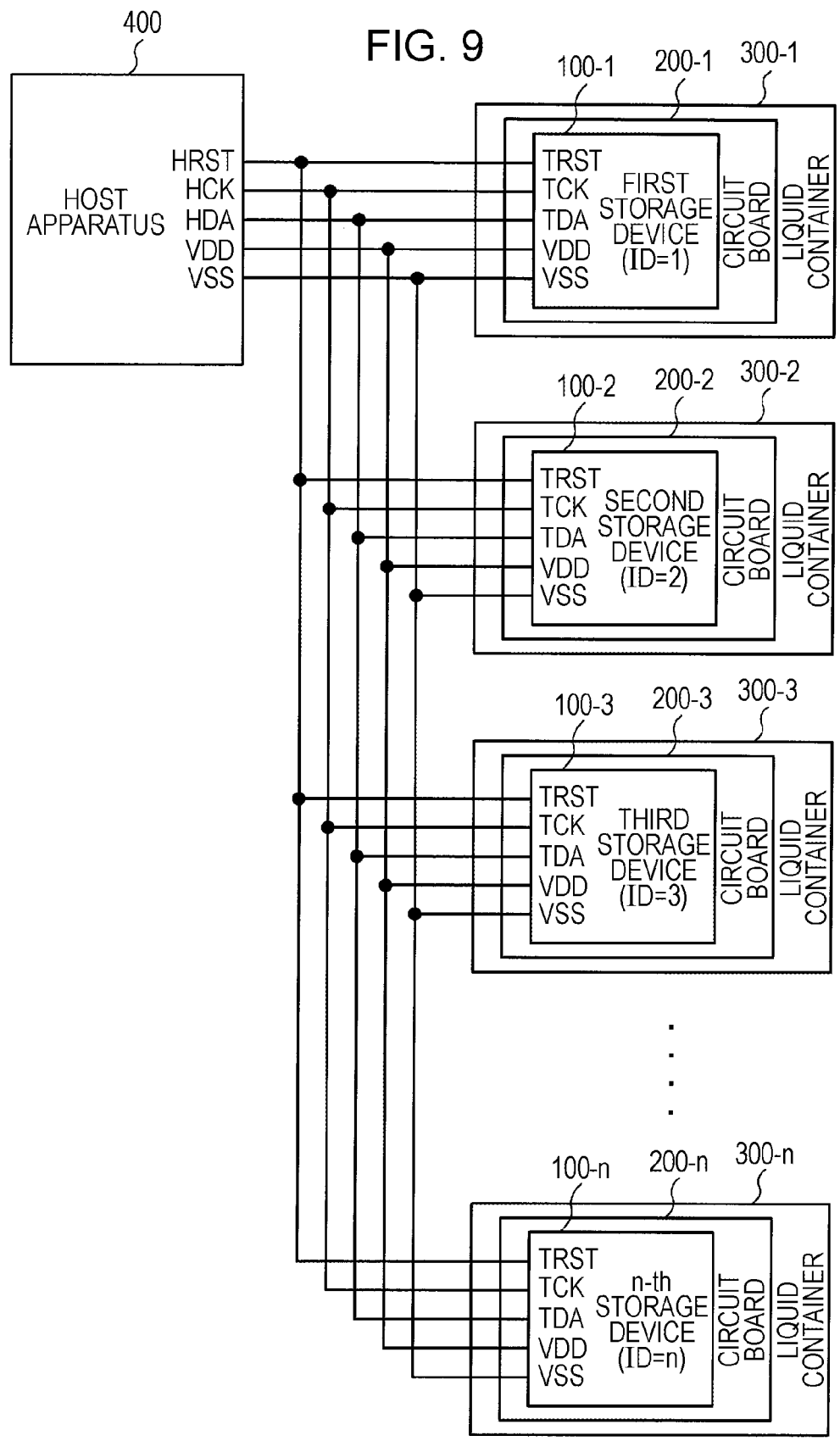
FIG. 9 is a diagram illustrating an example of a basic configuration of a system.

FIG. 9 illustrates an example of a basic configuration of a system according to the embodiment. The system according to the embodiment is for example, an ink jet type printer or the like and includes a first storage apparatus 100-1 to a n-th storage apparatus 100-n (n is an integer of 2 or more), n circuit boards 200-1 to 200-n on which the storage apparatuses are mounted, n liquid containers 300-1 to 300-n having the circuit boards, and a host apparatus 400. In addition, the system according to the embodiment is not limited to the configuration illustrated in FIG. 9, but various modifications may be available. For example, some of the components may be omitted, replaced with other components, or have other components added thereto.

Hereinafter, the case where the host apparatus 400 is an ink jet type printer main body, the liquid container 300 is an ink cartridge, and the circuit board 200 is a circuit board installed in the ink cartridge is described as an example. However, in the embodiment, the host apparatus, the liquid container, the circuit board may be different apparatus, container, and circuit board. For example, the host apparatus may be a memory card reader/writer, and the circuit board may be a circuit board which is installed in the memory card.

Each of the first storage apparatus 100-1 to the n-th storage apparatus 100-n includes a reset terminal TRST, a clock terminal TCK, a data terminal TDA, a first power supply terminal VDD, and a second power supply terminal VSS. Each of the n storage apparatuses 100-1 to 100-n includes the storage unit 120 (for example, a non-volatile memory, or the like); and ID (Identification) information (for example, ID=1, ID=2, ID=3, or the like) for identifying the n liquid containers (for example, ink cartridges, or the like) 300-1 to 300-n is stored in each of the storage units 120. Different ID is allocated according to the type of the color or the like of liquid contained in the liquid container. In addition, the data of an amount of ink remaining (or an ink consumption amount) or the like of the liquid container are written in the storage unit 120 by the host apparatus 400.

The host apparatus 400 is, for example, a printer main body or the like. The host apparatus 400 includes a host-side reset terminal HRST, a host-side clock terminal HCK, a host-side data terminal HDA, a first power supply terminal VDD, and a second power supply terminal VSS.

As described above, in the storage apparatus, the host apparatus, and the system according to the embodiment, the write enable bit WE of the data packet transmitted from the host apparatus to the storage apparatus may be set to be in a writing permitted state or the writing non-permitted state. Next, the storage apparatus determines based on the write enable bit WE of the received data packet whether or not the data are written in the storage unit. In the case where the writing is not permitted, the data are not written, and the storage apparatus may proceed to the reception process and the writing process with respect to the next data packet. In other words, the storage apparatus skips the data writing with respect to the data packet for which the writing is unnecessary, and the storage apparatus proceeds to the process with respect to the next data packet. As a result, it is possible to reduce the time of the data writing process with respect to the storage apparatus. In addition, since the writing process is not performed on the data for which the writing is unnecessary, it is possible to reduce the problem where the data which are already stored may be destroyed due to an error or the like at the time of writing the data.

Furthermore, in the storage apparatus, the host apparatus, the system according to the embodiment, in the data writing process, one of the two operation modes (first and second modes) may be selected.

In the first mode, since the host apparatus 400 may receive the acknowledgement ACK from each of the storage apparatuses 100, the host apparatus 400 may recognize that the data are normally written in each of the storage apparatuses 100. Therefore, for example, in the case where a printer is used in a general manner, the writing process in the first mode is performed, so that the re-writing process (retry) may be performed on the storage apparatus in which the data are not normally written. As a result, since the reliability of the data (amount of ink remaining or the like) stored in the storage apparatus is increased, it is possible to reduce the problem where ink remaining in the liquid container may not be used.

On the other hand, in the second mode, since the host apparatus proceeds to the transmission process with respect to the next storage apparatus without waiting for the acknowledgement ACK as a reply from the storage apparatus, it is possible to simultaneously perform a plurality of the memory writing processes. As a result, it is possible to reduce the total time of the data writing process with respect to the plurality of the storage apparatuses. In addition, according to the second mode, since the data of a specific address may be preferentially written in each of the storage apparatuses, in the case where the time of the writing process is limited, particularly important data (for example, data of the amount of ink remaining, ink end, or the like) may be preferentially written.

For example, in the case where electricity stoppage occurs during the use of the printer or in the case where a user unplugs a power cord from an outlet, the writing process in the second mode is performed, so that it is possible to complete the writing process with respect to particularly important data within a short power maintenance time. As a result, since the capacity of the power sustaining capacitor may be decreased, it is possible to reduce the manufacturing costs of the printer (system).

More specifically, for example, in the case where power is abnormally shut down due to electricity stoppage, unplugging from an outlet, or the like, a power supply circuit (not shown) of the printer main body (host apparatus) detects the abnormal power shut-down, the controller 420 commands the communication processing unit 410 to perform the data writing in the second mode based on the result of the detection. Next, the communication processing unit 410 may perform the data writing process in the second mode with respect to a plurality of the storage apparatuses 100-1 to 100-n which are connected to a bus. As described above, in the second mode, since the time of the writing process may be reduced, so that it is possible to complete the writing with respect to all the storage apparatuses within a limited power maintenance time.

Figure 10:
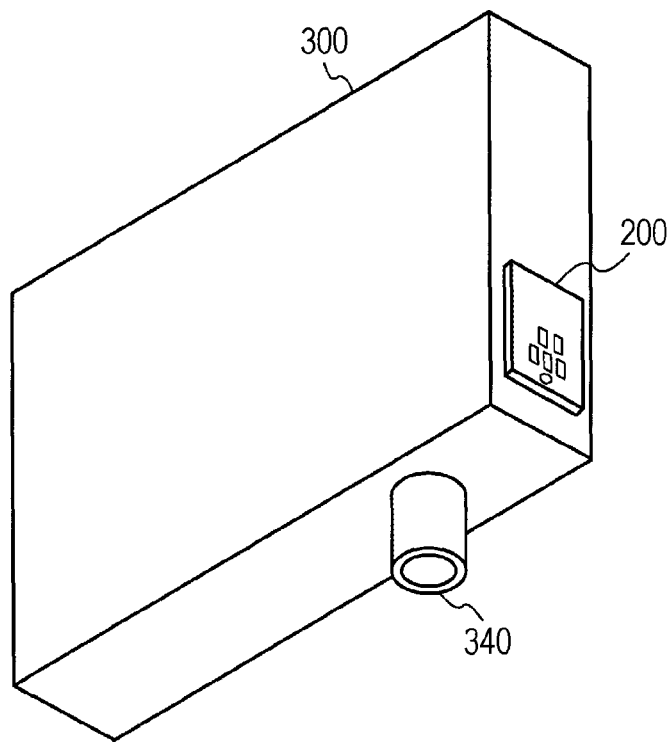
FIG. 10 is a diagram illustrating a detailed example of a configuration of a liquid container.

FIG. 10 illustrates a detailed example of a configuration of the liquid container (ink cartridge) 300 according to the embodiment. An ink chamber (not shown) for containing ink is formed inside the liquid container 300. In addition, an ink supply hole 340 which communicates with the ink chamber is installed in the liquid container 300. The ink supply hole 340 is used to supply ink to a print head unit when the liquid container 300 is mounted on the printer.

The liquid container 300 includes a circuit board 200. The storage apparatus 100 according to the embodiment is installed on the circuit board 200, so that the storing of the data such as the ink consumption amount or the data reception and transmission with respect to the host apparatus 400 is performed. The circuit board 200 is constructed with, for example, a printed board and is installed on the front surface of the liquid container 300. Terminals of a first power supply terminal VDD or the like are disposed on the circuit board 200. Next, when the liquid container 300 is mounted on the printer, the terminal and the printer-side terminal are in contact (electrically contact) with each other, so that the power or the data are exchanged.

Figure 11A:
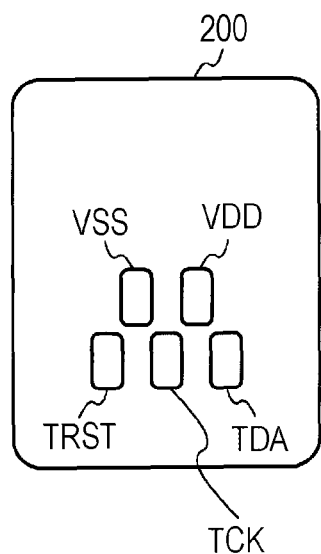
FIGS. 11A and 11B are diagrams illustrating a detailed example of a configuration of a circuit board.
Figure 11B:
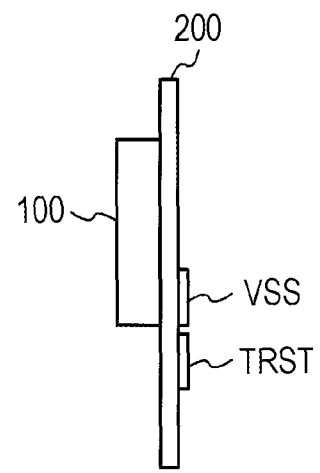

FIGS. 11A and 11B illustrate a detailed example of a configuration of the circuit board 200 on which the storage apparatus 100 according to the embodiment is installed. As illustrated in FIG. 11A, a terminal group including a plurality of terminals is disposed on the front surface the circuit board 200 (the surface in contact with the printer). The terminal group includes a first power supply terminal VDD, a second power supply terminal VSS, a reset terminal TRST, a clock terminal TCK, and a data terminal TDA. Each of the terminals is constructed with a metal terminal having, for example, a rectangular shape (substantially rectangular shape). In addition, each of the terminals is connected to the storage apparatus 100 through a wire line pattern layer or a through hole (not shown), which is disposed on the circuit board 200.

As illustrated in FIG. 11B, the storage apparatus 100 according to the embodiment is installed on the rear surface of the circuit board 200 (the surface opposite to the surface in contact with the printer). The storage apparatus 100 may be constructed with a semiconductor storage apparatus including, for example, a flash memory, a ferroelectric memory, or the like. Various data regarding ink or the liquid container 300 are stored in the storage apparatus 100. For example, data of ID information for identifying the liquid container 300, an ink consumption amount, or the like are stored. The data of the ink consumption amount are the data indicating an accumulation of the ink amount consumed in association with the printing performance or the like, in the ink contained in the liquid container 300. The data of the ink consumption amount may be the information indicating the ink amount in the liquid container 300 or the information indicating a ratio of the consumed ink amount.

In addition, hereinbefore, although the embodiments are described in detail, it may be understood by the ordinarily skilled in the related art that various modifications of the invention are available without substantially departing from new matters and effects of the invention. Therefore, it should be noted that these modifications are included in the invention. For example, in the specification and the drawings, terms which are at least one written together with different terms which have the same meaning or broader meaning may be replaced with the different terms in any portions of the specification or the drawings. In addition, the configurations and operations of the storage apparatus, the host apparatus, the circuit board, the liquid container, and the system are not limited to the embodiments described above, but various modifications are available.

The entire disclosure of Japanese Patent Application No. 2010-232683, filed Oct. 15, 2010 is expressly incorporated by reference herein.

What is claimed is:

1. A storage apparatus comprising:
 a controller that performs a communication to a host apparatus;
 a storage unit in which data from the host apparatus are written; and
 a storage controller that controls accessing to the storage unit, wherein the controller receives a command packet and a data packet corresponding to the command packet from the host apparatus, wherein in the case where a write enable bit of the data packet is set to be in a writing permitted state, the controller issues an update command for updating an address information on the storage controller and issues a write command to the storage controller for writing the data of the data packet on the storage unit, and wherein in the case where the write enable bit is set to be in a writing non-permitted state, the controller issues the update command for updating an address information on the storage controller and does not issue the write command to the storage controller;

wherein the controller has a first mode and a second mode as operation modes, wherein in the first mode, in the case where the write enable bit of the i-th data packet is set to be in a writing permitted state, the controller performs the write commanding of the data of the i-th data packet on the storage controller, and in the case where the data of the i-th data packet are normally written in the storage unit, the controller sends an acknowledgement as a reply to the host apparatus, and wherein in the second mode, in the case where the write enable bit of the i-th data packet is set to be in a writing permitted state, the controller performs the write commanding of the data of the i-th data packet on the storage controller and does not send the acknowledgement as a reply to the host apparatus.

2. The storage apparatus according to claim 1, wherein the controller receives first to m-th data packets (m is an integer of two or more) as a data packet corresponding to the command packet, wherein in the case where the write enable bit of the i-th (i is an integer of 1≤i≤m) data packet among the first to m-th data packets is set to be in the writing permitted state, the controller issues the update command for updating the address information on the storage controller and issues the write command for writing the data of the i-th data packet on the storage unit, and wherein in the case where the write enable bit of the i-th data packet is set to be in the writing non-permitted state, the controller issues the update command for updating the address information on the storage controller and does not issues the write command for writing the data of the i-th data packet on the storage unit.

3. The storage apparatus according to claim 2, wherein in the case where the write enable bit of the i-th data packet is set to be in a writing non-permitted state, the controller performs a reception process with respect to the (i+1)-th data packet without waiting for an internal acknowledgement from the storage controller.

4. The storage apparatus according to claim 3, wherein in the case where the write enable bit of the i-th data packet is set to be in a writing non-permitted state, the controller determines existence of a communication error with respect to the host apparatus, and in the case where it is determined that no communication error exists, the controller sends the acknowledgement as a reply to the host apparatus.

5. A circuit board comprising the storage apparatus according to claim 4.

6. A circuit board comprising the storage apparatus according to claim 3.

7. The storage apparatus according to claim 2, wherein the controller recognizes a bit corresponding to a write lock bit for the data stored in the storage unit among bits of a data field of the i-th data packet as a write enable bit.

8. A circuit board comprising the storage apparatus according to claim 7.

9. A circuit board comprising the storage apparatus according to claim 2.

10. The storage apparatus according to claim 1, wherein in a first period of the second mode, the controller receives a first command packet and the first data packet of which the write enable bit is set to be in a writing permitted state and performs the write commanding of the data of the first data packet on the storage controller, and wherein in a second period, the controller receives a second command packet, the first data packet of which the write enable bit is to be in a writing non-permitted state, and the second data packet, and in the case where the write enable bit of the second data packet is set to be in a writing permitted state, the controller performs the write commanding of the data of the second data packet on the storage controller.

11. The storage apparatus according to claim 10, wherein in the second period, when the controller receives the first data packet, the controller determines existence of the communication error with respect to the host apparatus without performing of the write commanding of the data of the first data packet, and in the case where it is determined that no communication error exists, the controller sends the acknowledgement as a reply to the host apparatus.

12. The storage apparatus according to claim 1, further comprising a reset terminal, wherein after the reception of the data packet, in internal acknowledgement waiting period which is a period for waiting for the internal acknowledgement from the storage controller, the controller determines based on a voltage level of the reset terminal whether the operation mode is the first mode or the second mode.

13. A circuit board comprising the storage apparatus according to claim 1.

14. A liquid container comprising the storage apparatus according to claim 1.

* * * * *